United States Patent
Martin et al.

(10) Patent No.: US 11,446,580 B2
(45) Date of Patent: Sep. 20, 2022

(54) RULE-BASED LEVEL GENERATION IN COMPUTER GAME

(71) Applicant: Square Enix Ltd., London (GB)

(72) Inventors: Michael James Martin, Newcastle, WA (US); Gordon Francis Duclos, Issaquah, WA (US); Noah Hughes, San Mateo, CA (US)

(73) Assignee: Square Enix Ltd., London (GB)

( * ) Notice: Subject to any disclaimer, the term of this patent is extended or adjusted under 35 U.S.C. 154(b) by 0 days.

(21) Appl. No.: 16/890,866

(22) Filed: Jun. 2, 2020

(65) Prior Publication Data

US 2020/0298124 A1    Sep. 24, 2020

Related U.S. Application Data

(63) Continuation-in-part of application No. 16/356,832, filed on Mar. 18, 2019.

(51) Int. Cl.
*A63F 13/95* (2014.01)
*A63F 13/60* (2014.01)
(Continued)

(52) U.S. Cl.
CPC ............ *A63F 13/60* (2014.09); *A63F 13/352* (2014.09); *A63F 13/45* (2014.09); *A63F 13/52* (2014.09)

(58) Field of Classification Search
CPC ........ A63F 13/52; A63F 13/577; A63F 13/53; A63F 13/60; A63F 13/63; A63F 13/57; A63F 2300/64; A63F 2300/807; A63F 13/352; A63F 13/358; A63F 13/45; G06T 15/04; G06T 19/20
See application file for complete search history.

(56) References Cited

U.S. PATENT DOCUMENTS

| | | | |
|---|---|---|---|
| 8,368,686 B2 * | 2/2013 | Sommers | G06T 17/00 345/419 |
| 10,520,644 B1 | 12/2019 | Mallet et al. | |

(Continued)

FOREIGN PATENT DOCUMENTS

| | | |
|---|---|---|
| JP | 5736501 B1 | 6/2015 |
| JP | 2018531635 A | 11/2018 |

OTHER PUBLICATIONS

"How do games like Diablo create randomly generated maps?", 2013, Reddit, <https://www.reddit.com/r/gamedev/comments/1u1am1/how_do_games_like_diablo_create_randomly/> (Year: 2013).*

(Continued)

*Primary Examiner* — Justin L Myhr
(74) *Attorney, Agent, or Firm* — Fenwick & West LLP

(57) ABSTRACT

Embodiments relate to hexagonal fragmentation of terrain. A hive manifest specifying one or more conditions and rules for game level generation using hexagonal terrain tiles is received at a computing device. A set of hexagonal terrain tiles satisfying the one or more conditions and rules specified by the hive manifest are identified. Hexagonal terrain tile definition data corresponding to the identified set of hexagonal terrain tiles is retrieved. A game level using the retrieved hexagonal terrain tile definition data is generated by instantiating a subset of hexagonal terrain tiles of the set of hexagonal terrain tiles as a sub-level of the game level.

17 Claims, 9 Drawing Sheets

(51) Int. Cl.
*A63F 13/52* (2014.01)
*A63F 13/45* (2014.01)
*A63F 13/352* (2014.01)

(56) References Cited

U.S. PATENT DOCUMENTS

| | | |
|---|---|---|
| 2003/0058238 A1 | 3/2003 | Doak et al. |
| 2004/0151388 A1 | 8/2004 | Maeda |
| 2005/0035964 A1 | 2/2005 | Heenan |
| 2016/0274887 A1 | 9/2016 | Sternfeld et al. |
| 2017/0046882 A1* | 2/2017 | Lane ................. G06T 17/05 |
| 2020/0179807 A1* | 6/2020 | Yu ...................... A63F 13/67 |

OTHER PUBLICATIONS

Barrett, S. "Herringbone Tiles." Nothings.org, Unfinished paper, Oct. 22, 2011, pp. 1-6, [Online] [Retrieved Aug. 11, 2020], Retrieved from the internet <URL: https://nothings.org/gamedev/herringbone/herringbone_tiles.html>.

Turner, N. "Seeded Exploration of Wang Tiled Environments." Gamasutra.com, Blogs, 12 pages, Apr. 11, 2017, [Online] [Retrieved Aug. 11, 2020] Retrieved from the internet <URL:https://www.gamasutra.com/blogs/NickTurner/20170411/295783/Seeded_Exploration_of_Wang_Tiled_Environments.php>.

United States Office Action, U.S. Appl. No. 16/356,832, dated Jul. 17, 2020, 11 pages.

* cited by examiner

US 11,446,580 B2

RULE-BASED LEVEL GENERATION IN COMPUTER GAME

CROSS-REFERENCE TO RELATED APPLICATION

This application is a continuation-in-part of U.S. application Ser. No. 16/356,832, filed Mar. 18, 2019, which is incorporated by reference in its entirety.

BACKGROUND

The present disclosure relates to hexagonal fragmentation of terrain, and more specifically, to assembling maps using hexagonal terrain fragments.

Many video games include a game board, map, or so on (in general, a "terrain") upon which the video game takes place. For example, the video game may include a board upon which various game pieces are placed and moved during the course of the video game. Video games often include a large amount of software and data that takes significant time and computing resources to upload, transmit, download, or otherwise use. The terrain is often one of the largest segments of this software and data. As such, uploading, transmitting, downloading, or otherwise using the terrain typically uses significant time and computing resources. Furthermore, terrains are typically immutable and often repetitive, which can cause players of video games that include the terrains to lose interest in the video games.

SUMMARY

Embodiments relate to hexagonal fragmentation of terrain. A client device receives a hive manifest specifying one or more conditions and rules for game level generation using hexagonal terrain tiles. The client device identifies a set of hexagonal terrain tiles satisfying the one or more conditions and rules specified by the hive manifest. The client device retrieves hexagonal terrain tile definition data corresponding to the identified set of hexagonal terrain tiles. The client device generates a game level using the retrieved hexagonal terrain tile definition data by instantiating a subset of hexagonal terrain tiles of the set of hexagonal terrain tiles as a sub-level of the game level.

In one or more embodiments, the client device detects that a game player has completed the generated sub-level and generates a second sub-level including a set of hexagonal terrain tiles that satisfy the one or more conditions and rules specified by the hive manifest.

In one or more embodiments, the client device generates a second game level using the retrieved hexagonal terrain tile definition data by instantiating a second subset of hexagonal terrain tiles of the set of hexagonal terrain tiles as a sub-level of the second game level, wherein the second subset of hexagonal terrain tiles includes at least one different hexagonal terrain tile than the subset of hexagonal terrain tiles.

In one or more embodiments, a condition of the hive manifest specifies a weight for a category of hexagonal terrain tile, wherein a likelihood of inclusion in the subset of hexagonal terrain tiles of hexagonal terrain tiles of the category is proportional to the specified weight.

In one or more embodiments, a rule of the hive manifest overrides a rule of a hexagonal terrain tile in the subset of hexagonal terrain tiles.

In one or more embodiments, the client device receives the hive manifest from a game server separate from the client device.

In one or more embodiments, the hive manifest specifies a gameplay mission parameter.

Figure 1:
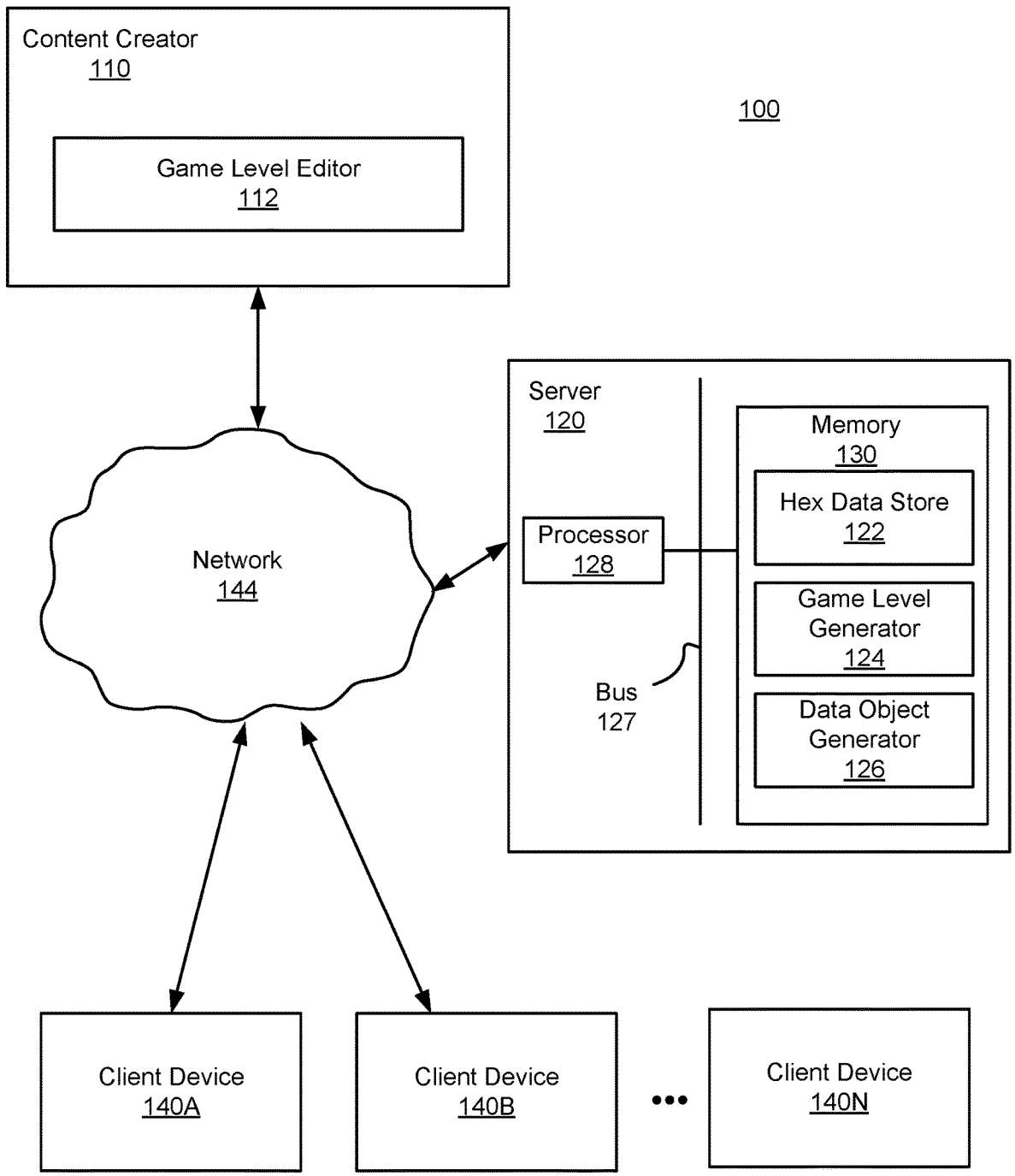
FIG. 1 is a block diagram of a system, according to an embodiment.

The figures depict various embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments relate to hexagonal fragmentation of terrain. Terrain data including locations on a terrain and corresponding hex identifiers of hexagonal terrain tiles of a three-dimensional topology to be placed at the locations are received at a computing device. Hex definition data corresponding to a hexagonal terrain tile includes a constraint condition imposed on an adjacent hexagonal terrain tile so that it can be placed adjacent to the hexagonal terrain tiles. A representation of the terrain is generated by instantiating the hexagonal terrain tiles at the locations indicated in the terrain data with faces of one or more of the hexagonal terrain adjoined to each other in compliance with the constraint condition.

Among other advantages, embodiments enable efficient transfer of terrain data with low latency. Furthermore, embodiments enable flexible terrain design and implementation, enabling greater customization and variety throughout the terrain. As such, both computing device performance and user experience may be improved. Hexagonal fragmentation of terrain also reduces demarcations between adjacent tiles, leading to a more organic and immersive terrain, further improving user experience.

In some embodiments, a terrain includes a hive. A hive is a set of hexagonal terrain tiles organized into sub-levels, where gameplay progresses from one sub-level to the next until each sub-level has been completed. Hives are generated by game systems according to hive manifests, which specify rules and conditions for hive generation. Client devices download hive manifests from game servers, which in turn receive hive manifests from content creators. Rather than specifying particular hexagonal terrain tiles to construct a hive, the hive manifest specifies conditions and rules to qualify or disqualify hexes for inclusion on each sub-level of the hive. During game play, if a player enters a hive, the hive is dynamically generated according to the conditions and rules of the hive manifest. The game system selects appropriate hexagonal terrain tiles matching the rules and conditions, which may depend upon a metric of player progress through the game, and uses the selected hexagonal terrain tiles to generate each sub-level of the hive as the player progresses through the hive.

By specifying conditions and rules for hive generation rather than particular hexagonal terrain tiles, hex manifests can be reused to generate new hives that are distinct from one another, e.g., include different hexagonal terrain tiles. For example, as a player's character increases in level, or as game progress advances, the conditions and rules may specify different types of hexagonal terrain tiles to use for hive generation. As such, different hives are generated as the player progresses through the game. Furthermore, since hive manifests do not include hex definition data specifying the contents of a hex, they use fewer computing resources to upload, download, or store than preconfigured game levels that include hex definitions for each hexagonal terrain tile in the terrain of the preconfigured game level.

Embodiments are described herein with reference to the figures where like reference numbers indicate identical or functionally similar elements. Also in the figures, the left most digit or digits of each reference number correspond to the figure in which the reference number is first used.

FIG. 1 is a block diagram of a system 100 in which the techniques described herein may be practiced, according to an embodiment. The system 100 includes a content creator 110, a server 120, client devices 140, and a network 144. In other embodiments the system 100 may include additional content creators 110 or servers 120, or may include a singular client device 140.

The content creator 110, the server 120, and the client devices 140 are configured to communicate via the network 144. The network 144 includes any combination of local area and/or wide area networks, using both wired and/or wireless communication systems. In one embodiment, the network 144 uses standard communications technologies and/or protocols. For example, the network 144 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 144 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 144 may be represented using any suitable format, such as hypertext markup language (HTML) or extensible markup language (XML). In some embodiments, all or some of the communication links of the network 144 may be encrypted using any suitable technique or techniques.

The content creator 110 is a computing device, such as a gaming system, a personal computer, a mobile phone, a tablet, or so on, which includes and can execute a game level editor 112. The game level editor 112 is a software application for designing terrains or hive manifests for one or more games. Terrains include one or more three-dimensional ("3D") hexagonal terrain tiles ("hexes") in a specific arrangement. The hexes, when positioned in the specific arrangement, form a particular 3D topology. Hexes and terrains are described in greater detail below with reference to FIG. 4.

A user of the content creator 110 uses the game level editor 112 to create terrains or hive manifests. For example, the user may use the game level editor 112 to piece together a variety of hexes into a desired arrangement to form a custom terrain. The user may use the game level editor 112 to rotate and/or move hexes, copy hexes, or so on while piecing together the hexes into the desired arrangement. The game level editor 112 may monitor one or more constraint conditions associated with each hex and prevent placement of a hex at a location if it breaches at least one constrain condition of at least one adjacent hex. The game level editor 112 may indicate the prevention and/or the at least one constraint condition to the user, such as at a user interface of the game level editor 112 displayed at a display of the content creator 110. The user may use the game level editor 112 to specify other aspects of the game that involve the terrain, such as one or more objectives that occur at various locations upon the terrain, or objects to be included at various locations upon the terrain.

In one embodiment, the user can use the game level editor 112 to leave one or more locations upon the terrain empty, as gaps in the arrangement of hexes. In such an embodiment, the game level editor 112, the server 120, or the client device 140 uses a hex matching technique to automatically fill each empty terrain location with an appropriate hex. In this context, a hex is appropriate if it complies with the constraint conditions of each adjacent hex. Furthermore, in one embodiment, the game level editor 112 places wedges at appropriate locations about the hexes. Wedges are described in greater detail below with reference to FIG. 5. The game level editor 112 may save the custom terrain and/or send it to the server 120 and/or client devices 140. The game level editor 112 may prevent the saving and/or sending of the custom terrain if the custom terrain includes one or more hexes breaching one or more constraint conditions of one or more adjacent hexes.

In an embodiment, a user of the content creator 110 uses the game level editor 112 to create hive manifests. For example, the user may use the game level editor 112 to specify one or more conditions or rules of the hive manifest. The game level editor 112 may save the hive manifest and/or send it to the server 120 and/or client devices 140.

The server 120 is a computing device that includes a processor 128 and a memory 130 connected by a bus 127. The memory 130 includes a hex data store 122, a game level generator 124, and a data object generator 126. The server 120 may receive and route messages between the content creator 110 and the client devices 140. Additionally, the server 120 may store in memory 130 one or more terrains, such as a terrain received by the server 120 from a content creator 110, and send one or more terrains to the client devices 140. The server 120 may additionally store in memory 130 one or more hive manifests, such as a hive manifest received from the content creator 110, and send the hive manifest to the client devices 140.

The processor 128 is capable of executing instructions, sequential or otherwise, that specify actions to be taken, such as performance of some or all of the techniques described herein. The bus 127 connects the processor 128 to the memory 130, enabling data transfer from the one to the other and vice versa. Depending upon the embodiment, the server 120 may include additional elements conventional to computing devices, as known to a person having ordinary skill in the art.

The hex data store 122 stores hexes, terrains, and hive manifests. For example, the hex data store 122 may store a template of each hex, as well as each permutation of the hex, as described below with reference to FIG. 4. The hex data store 122 also stores terrains and/or hive manifests received from content creators 110 or created by a creator of the game or administrator of the server 120. The hex data store 122 may also store metadata associated with a hex, terrain, or hive manifest, such as a hex identifier, a terrain identifier, or a hive manifest identifier, an identifier of the creator of the hex, terrain, or hive manifest, a size of the hex, terrain, or hive manifest, (as measured, for example, in megabytes ("MB")), or so on. The hex data store 122 may also store information such as game objectives, objects, or so on that relate to the hex, terrain, or hive manifest, but are not necessarily part of the hex, terrain, or hive manifest.

The game level generator 124 generates hexes and/or terrains. For example, the game level generator 124 generates a terrain using a hex matching technique that factors for constraint conditions. The hex matching technique may account for various other factors, depending upon the embodiment, such as a terrain size (e.g., a number of locations or hexes), a type of terrain (e.g., a "desert night" versus a "rainy jungle"), a game objective (e.g., "defeat 15 enemies"), or the like. The various other factors may be randomly generated, or received as input from an outside source, such as the game creator or the administrator of the server 120.

In an embodiment, the game level generator 124 may generate new hexes. For example, the game level generator 124 may generate a new hex randomly, or based on input received from an outside source, or to fill a gap in a terrain that cannot be appropriately filled by an existing hex. The game level generator 124 generates a new hex by determining one or more constraint conditions for the hex, as well as a set of objects, e.g., graphical elements, audio assets, or interactive game components, to include within the hex. Based on the constraint conditions, the game level generator 124 generates a 3D topography for the hex, and situates each object in the set of objects at an appropriate position within the hex, based on constraint conditions of the objects and the hex. For example, in one embodiment, a "tree" object may be placed upon a "forest" portion of a hex, but not upon a "waterfall" portion of a hex.

The data object generator 126 generates data objects, such as JSON documents, for transmitting terrains. Terrains often include a large amount of data, large enough that uploading, transmitting, and downloading the data involves significant latency. Techniques described herein, including those pertaining to the data object generator 126, address this latency by lessening the amount of data involved in transmitting a terrain. In an embodiment, the data object generator 126 generates data objects, such as JSON documents, for transmitting hive manifests.

Each hex, as described below with reference to FIG. 4, is associated with a hex identifier that distinguishes the hex from other hexes. When generating a data object, the data object generator 126 includes in the data object terrain data that includes one or more hex identifiers, where each hex identifier corresponds to at least one hex in the terrain described by the terrain data. The terrain data also includes a graph or other data structure describing the locations with respect to one another such that the terrain data represents the overall underlying structure of the terrain. Furthermore, the terrain data includes a mapping of locations to hex identifiers, such that the terrain can be properly reconstructed based on the terrain data by correctly associating each hex with a particular location within the terrain.

The data object generated by the data object generator 126 can include hex identifiers, locations, and so on, as described above, but not the full hex data of each hex. As such, the data object is much smaller than it would be if it contained the hex data of each hex. The data object is therefore conducive to more efficient, lower latency use, e.g. upload, transmittal, or download, than a full terrain is, and involves the use of fewer computing resources, e.g. processor cycles and active memory. The client devices 140 receive the data object and use locally stored hex data to reconstruct the terrain represented by the data object.

Each client device 140 is a computing device that includes a game or other software that uses a terrain. The client device 140 receives data objects from the server 120 and uses the data objects to construct terrains for use, for example, in the game. Different client devices 140 can request different data objects from the server 120. For example, client device 140A can request a first terrain from the server, client device 140B can request a second terrain from the server 120, and so on; client device 140N can request an $N^{th}$ terrain from the server 120.

The server 120 may send a data object to a client device 140 that corresponds to the terrain requested by the client device 140. For example, client device 140A may receive a first data object corresponding to the requested first terrain, and so on. Client devices 140 include, for each hex, full hex data used to fill out a terrain when reconstructing the terrain based on its corresponding data object. Client devices 140 are further described with reference to FIGS. 2-4 below.

Figure 2:
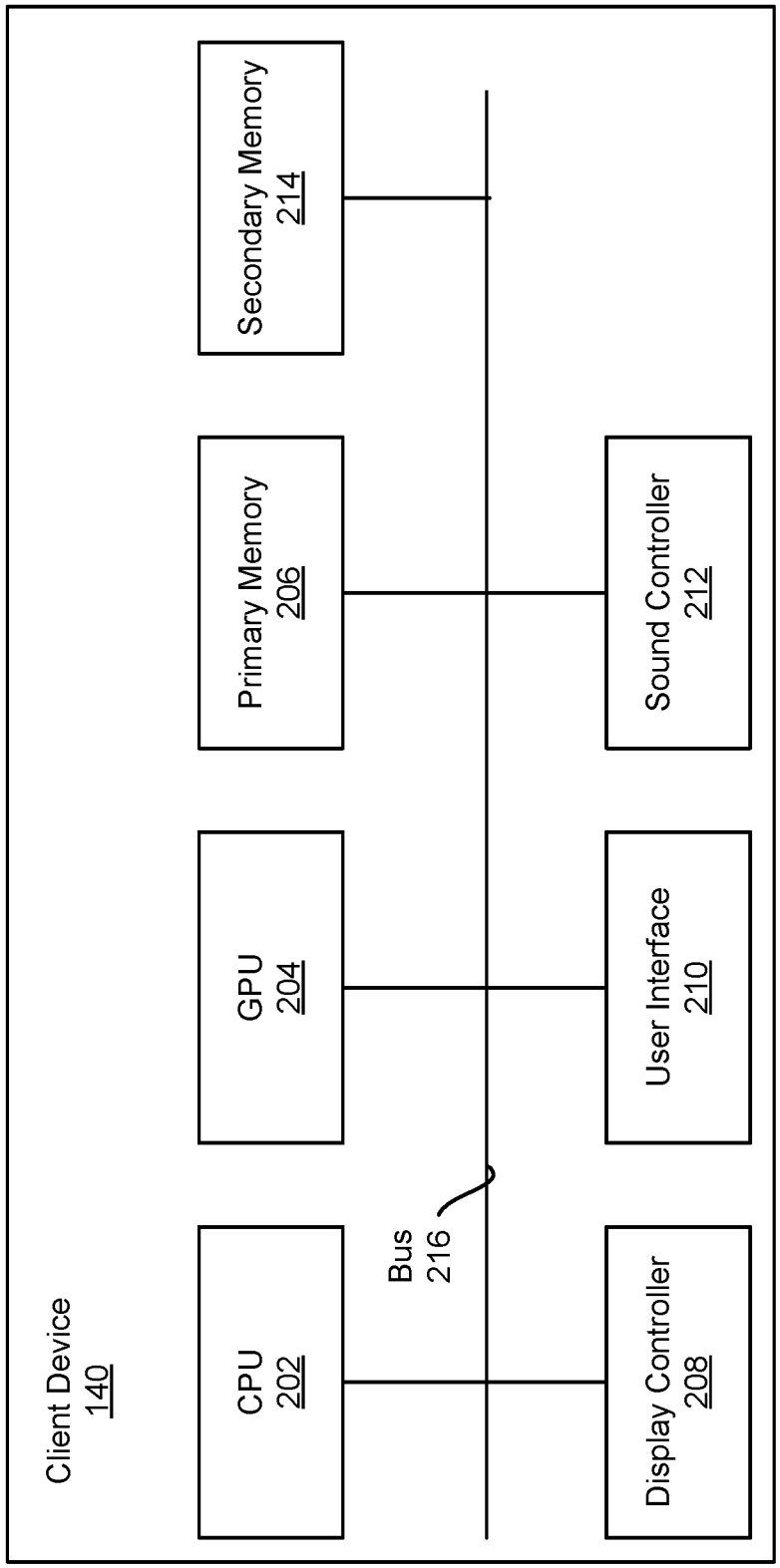
FIG. 2 is a block diagram of the client device of FIG. 1, according to an embodiment.

FIG. 2 is a block diagram of the client device 140 of FIG. 1, according to an embodiment. Depending upon the embodiment, the content creator 110 and/or server 120 may comprise a computing device that includes some or all of the hardware and/or software elements of the client device 140 described herein. The client device 140, content creator 110, and/or server 120 are any machine capable of executing instructions, and may each be a standalone device or a connected (e.g. networked) set of devices. For example, in one embodiment, the content creator 110 is a client device 140.

The client device 140 includes a central processing unit ("CPU") 202, a graphics processing unit ("GPU") 204, a primary memory 206, a secondary memory 214, a display controller 208, a user interface 210, and a sound controller 212 that are connected by a bus 216. While only a single client device 140 is illustrated, other embodiments may include any collection of client devices 140 that individually or jointly execute instructions to perform any one or more of the methodologies discussed herein.

The primary memory 206 is a machine-readable medium that stores instructions (e.g., software) embodying any one or more of the methodologies or functions described herein. For example, the primary memory 206 may store instructions that, when executed by the CPU 202, configure the CPU 202 to perform a process 700, described below in detail with reference to FIG. 7. Instructions may also reside, partially or completely, within the CPU 202 and/or GPU 204, e.g., within cache memory, during execution of the instructions.

The term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the device and that cause the device to perform any one or more of the methodologies disclosed herein. The term "machine-readable medium" includes, but is not limited to, data repositories in the form of solid-state memories, optical media, and magnetic media.

The secondary memory 214 is a memory separate from the primary memory 206. Similar to the primary memory 206, the secondary memory 214 is a machine-readable medium that stores instructions (e.g., software) embodying any one or more of the methodologies or functions described herein. For example, the primary memory 206 may be a hard drive of the client device 140, and the secondary memory 214 may be a game disc for the game that uses the terrain. As a specific example, the primary memory 206 may store a game system 300 that uses hex data stored on the secondary memory 214. Primary memory 206 and secondary memory 214 are described in greater detail with reference to FIG. 3 below.

The CPU 202 is processing circuitry configured to carry out the instructions stored in the primary memory 206 and/or secondary memory 214. The CPU 202 may be a general-purpose or embedded processor using any of a variety of instruction set architectures (ISAs). Although a single CPU is illustrated in FIG. 2, the client device 140 may include multiple CPUs 202. In multiprocessor systems, each of the CPUs 202 may commonly, but not necessarily, implement the same ISA.

The GPU 204 is a processing circuit specifically designed for efficient processing of graphical images. The GPU 204 may render objects to be displayed into a frame buffer (e.g., one that includes pixel data for an entire frame) based on instructions from the CPU 202. The GPU 204 may include one or more graphics processors that may execute graphics software to perform a part or all of the graphics operations.

The display controller 208 is a circuit that generates a video signal using graphical data from the GPU 204. For example, the display controller 208 drives a display device (e.g., a liquid crystal display (LCD) and a projector). As such, a game, including terrain, can be displayed as images or a video sequence through the display controller 208.

The sound controller 212 is a circuit that provides input and output of audio signals to and from the client device 140. For purposes of a terrain, the sound controller 212 can provide audio signals that align with actions and objects in the terrain, e.g. at particular hexes, or parts of hexes.

The user interface 210 is hardware, software, firmware, or a combination thereof that enables a user to interact with the client device 140. The user interface 210 can include an alphanumeric input device (e.g., a keyboard) and a cursor control device (e.g., a mouse, a trackball, a joystick, a motion sensor, or other pointing instrument). For example, a user uses a keyboard and mouse to control a character's action within a game environment that includes a terrain or hive rendered by the client device 140. The game environment includes a simulation and rendering of the terrain, within which the user's game character operates.

The client device 140 executes computer program modules for providing functionality described herein. As used herein, the term "module" refers to computer program instructions and/or other logic used to provide the specified functionality. Thus, a module can be implemented in hardware, firmware, and/or software. In some embodiments, program modules formed of executable computer program instructions are loaded into the memory 206, and executed by the CPU 202 or the GPU 204. For example, program instructions for the process 700 describe herein can be loaded into the primary memory 206 and/or secondary memory 214, and executed by the CPU 202 and GPU 204.

Figure 3:
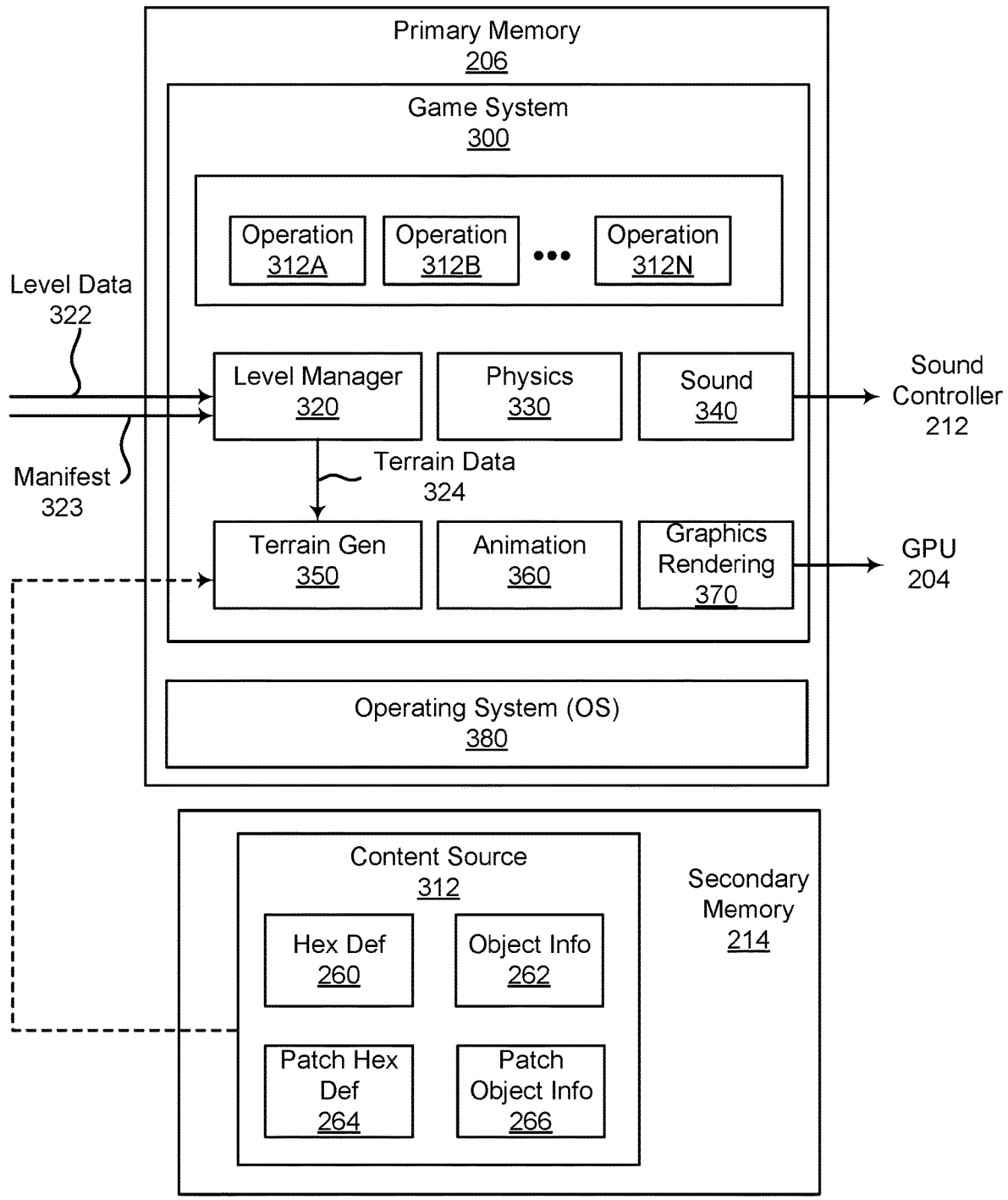
FIG. 3 is a block diagram of software modules in a memory of the client device of FIG. 1, according to an embodiment.

FIG. 3 is a block diagram of software modules in a memory of the client device 140 of FIG. 1, according to an embodiment. In particular, FIG. 3 illustrates software modules in the primary memory 206 and the secondary memory 214 of the client device 140. The primary memory 206 may store, among other modules, a game system 300 and an operating system ("OS") 380. The secondary memory 214 may store, among other modules, a content source 312. The primary memory 206 and secondary memory 214 may include other modules not illustrated in FIG. 3. Furthermore, in other embodiments, the primary memory 206 and secondary memory 214 may each store software modules and data represented herein as stored in the other.

The game system 300 includes a level manager 320, a physics system 330, a sound module 340, a terrain generator 350, an animation module 360, and a graphics rendering module 370. These modules collectively form a "game engine" of the game system 300.

The game system 300 performs operations 312A through 312N (collectively referred to as "the operations 312") to generate the game environment, including the terrain. Specifically, the game system 300 performs these operations 312 to construct the terrain, instantiate various objects upon the terrain (e.g., the user's game character), and simulate interactions between the objects. The operations 312 refer to computing operations that result in changes in various parameters (e.g., states of objects and user status) based upon certain events (e.g., user interactions, expirations of time, and triggers occurring in the game).

Some operations 312 are associated with one or more objects, hexes, or positions within hexes in the game environment, and/or one or more actions associated with the objects, hexes, or positions within hexes. Examples of operations include a catapult launching a rock, a character running, fluid flowing, an arrow flying, a door opening, and so on. While some operations 312 have relatively simple responses (e.g., door opening), other operations may need to be simulated by the physics system 330 (e.g., movement of connected bodies). When executing the operations 312, the game system 300 may communicate with the components of the game engine (e.g., physics system 330) through application programming interfaces (APIs). At least one of these operations 312 involves constructing the terrain from terrain data and hex data.

The level manager 320 receives data objects, i.e., level data 322, from the server 120 and stores the level data 322 in the primary memory 206. Other modules of the game system 300 can request one or more levels from the level manager 320, which responds to the requests by sending the level data 322 corresponding to the requested level to the module of the game system 300 that sent the request. Alternatively, the level manager 320 may construct a terrain template from the level data 322. The terrain template is a terrain without hex data. For example, the terrain template is a graph of locations, where each location in the graph is associated with a hex identifier. The terrain template or other terrain data 324 may be sent, for example, to the terrain generator 350, such as in response to a request from the terrain generator 350 for the terrain data 324. Terrain data 324 may include any level data 322, depending upon the embodiment.

The level manager 320 also receives hive manifests 323 from the server 120 and stores the hive manifests 323 in the primary memory 206. The level manager 320 uses the hive manifest 323 to generate a hive, as described in greater detail below with reference to FIG. 8.

The terrain generator 350 generates a complete terrain based on terrain data 324 and hex data. The terrain generator 350 receives terrain data 324 from the level manager 320 and hex and object data from the content source 312 in the secondary memory 214, as described in greater detail below. In one embodiment, the terrain generator 350 uses hex data to fill in a terrain template. For example, for each location within the terrain template, the terrain generator 350 uses the associated hex identifier to retrieve hex data for the hex identified by the hex identifier. The terrain generator 350 uses the retrieved hex data to construct the terrain, combining the retrieved, full hex data to turn the terrain template into a complete terrain that includes the full hex data (rather than just hex identifiers).

The physics system 330 models and simulates the dynamics of objects in the game environment. After an operation 312 is initiated in the game system 300, the physics system 330 models how the action affects the object associated with the operation 312. For example, the physics system models a rock as it rolls down a hill. Depending on the action and object, other objects and actions may become associated with the action or object. For example, a thrown rock may knock over another object. This may trigger a new operation 312 where the object is hit by the rock. The physics system 330 uses terrain information, e.g. data pertaining to a terrain generated by the terrain generator 350, when modeling and simulating the dynamics of the objects in the game environment. For example, returning to the rolling rock example, the physics system 330 may determine that the rock must roll down the hill by identifying that the rock is positioned within the terrain such that it is on a slope of the hill.

The animation system 360 is a module that performs kinematic animation of objects or the game environment based on the operations 312 from the game system 300. For example, if an operation 312 specifies that a robotic arm is moving, the animation system animates the kinematics of the arm movement. The animation system 360 may include any number of specialized modules which perform specific animation tasks. The animation system 360 may use information pertaining to a terrain generated by the terrain generator 350 as a factor in the performance of kinematic animation of objects or the game environment.

The sound module 340 generates sounds corresponding to actions occurring in the game environment or to hexes or portions of hexes. For example, a portion of a hex including a "river" object may correspond to a "flowing water" sound. Animation data from the animation system 360 or terrain information from the terrain generator 350 may be sent to the sound module 340 to enable the sound module 340 to produce sound. The sound module 340 sends sound data to the sound controller 212.

The graphics rendering module 370 renders graphics from the animation system 360 and terrain generator 350 to generate an image of the game environment. For example, the graphics rendering module 370 receives a scene file from the animation system 360 and a generated terrain from the terrain generator 350. The graphics rendering module 370 sends graphical data to the GPU 204 to render images on a display, e.g. a display of the client device 140 or a display connected to the client device 140, via the display controller 208.

The OS 380 manages computer hardware and software resources. Specifically, the OS 380 acts as an intermediary between programs and the computer hardware. For example, the OS 380 can perform basic tasks, such as recognizing input from the user interface 210 and sending output to the display controller 208.

The content source 312 includes various hex data and object data, including a hex definition module 260, an object information module 262, a patch hex definition module 264, and a patch object information module 266. The content source 312 sends hex data to the terrain generator 350 upon receiving a request for the hex data from the terrain generator 350. For example, upon receiving a request for hex data corresponding to a particular hex identifier, the content source 312 sends the hex data (and/or object data) corresponding to the particular hex identifier (and any object identifiers associated with the hex identifier) to the terrain generator.

The hex definition module 260 includes hex definition data for each hex and each permutation of each hex. As described below with reference to FIG. 4, each hex has one or more permutations that are alternative ways of using the hex, such as various rotations of the hex, various lighting conditions of the hex, or so on. The hex definition module 260 includes this permutation data as well as the full hex data for each hex. The full hex data is the complete set of data pertaining to the hex referred to by a hex identifier. For example, the full hex data may include data describing the 3D topography represented by the hex, various features of the hex, various lighting permutations, and so on. Features of the hex may include geographic elements, such as roads, forests, rivers, hills, and so on, that are included within the hex at particular locations within the hex.

The object information module 262 stores object information. Object information is data pertaining to objects within the game environment, such as the user's game character, non-player characters ("NPC's"), and other interactive game elements (e.g. weapons, tools, clothes, rocks, doors, etc.). Objects can be associated with hexes or positions within hexes. For example, a user of the game level editor 112 may add a tool to a position within a hex when designing a terrain. This information is included in the data object when the server 120 sends the terrain to the client device 140. For example, each object may be associated with an object identifier, and the data object may include the object identifiers of each object included in the terrain such that the terrain generator 350 can reconstruct the terrain from the data object and data from the content source 312.

Patches are updates or additions to software modules or data that are typically applied to the software modules or data after it is loaded into a memory. For example, a patch may be applied to a software module several weeks after the release and downloading of the software module by client devices 140 in order to address one or more bugs in the software module, or to add new content to the software module. As a specific example, a patch to the content source 312 may add new hex data or object data, such as a new "jungle" hex, a new permutation for each extant hex, or a new object, such as a hat.

The patch hex definition module 264 and the patch object information module 266 incorporate patch information that involves hex data and object data, respectively. For example, the client device 140 may download a patch over the network 144, such as a patch provided by the server 120 or the content creator 110. The client device 140 may then send the patch to the content source 312. The patch hex definition module 264 incorporates hex data included in the patch, such as a new hex, into the hex definition module 260, and the patch object information module 266 incorporates object data included into the patch, such as a new object, into the object information module 262.

Figure 4A:
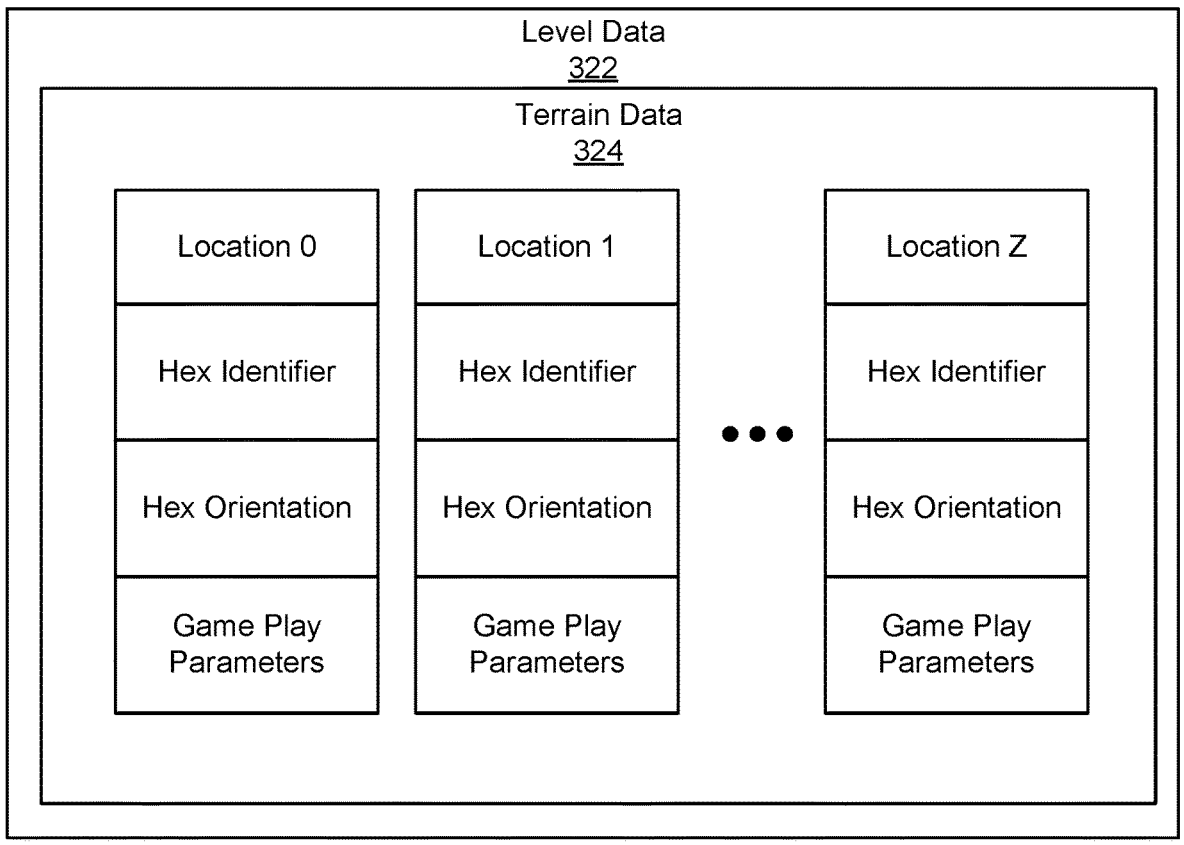
FIG. 4A is a block diagram of level data used by software modules in memory of the client device of FIG. 1, according to an embodiment.

FIG. 4A is a block diagram of level data 322 used by the software modules in the memory of the client device of FIG. 1, according to an embodiment. The level data 322 represents a terrain and includes terrain data 324 describing the terrain. The level data 322 may also include other information, such as game objectives or objects associated with the terrain. In an embodiment, the level data 322 is the data object sent by the server 120 to the client device 140. The level data 322 includes a graph or other data structure describing the locations within the terrain with respect to one another such that the terrain data 324 represents the overall underlying structure of the terrain. In an embodiment, locations are numbered, beginning with a central location, and then spiraling outward clockwise; the terrain generator 350 may use this information to properly construct the terrain such that each hex is at the proper location, and each location is situated properly within the terrain with respect to one another. For example, as in the figure, the locations may be labeled "location 0," "location 1," and so on, to a $Z^{th}$ location.

Each location within the terrain data 324 is associated with a hex identifier, a hex orientation, and a set of game play parameters. The hex identifier associated with the location indicates the hex that the terrain generator 350 should place at the location. The hex orientation indicates a particular permutation of the hex to use. Hexagons have six sides, and hexes, which are 3D, are hexagonal prisms with a top, a bottom, and six faces. As such, there are six possible rotation permutations for each hex, each where a different face of the hex faces the same direction (i.e., the hex is rotated a multiple of 60 degrees). The hex orientation indicates which rotation permutation is associated with the location. The set of game play parameters may include, depending upon the embodiment, a lighting permutation, various object identifiers associated with the location or the hex represented by the hex identifier, or so on. Lighting permutations are discussed below with reference to FIG. 4B. Object identifiers included in the set of game play parameters indicate objects that the terrain generator 350 is to place within the terrain at the hex represented by the hex identifier. The set of gameplay parameters may further include information specifying where each object should be placed within the hex. In other embodiments the set of game play parameters may include additional or different data, such as data pertaining to one or more game play objectives. In an embodiment, rather than having a hex identifier, a hex orientation, a lighting permutation, and so on, every possible overall permutation of a hex has a different hex identifier, and the terrain data 324 simply includes, for each location, the hex identifier and a set of game play parameters.

Figure 4B:
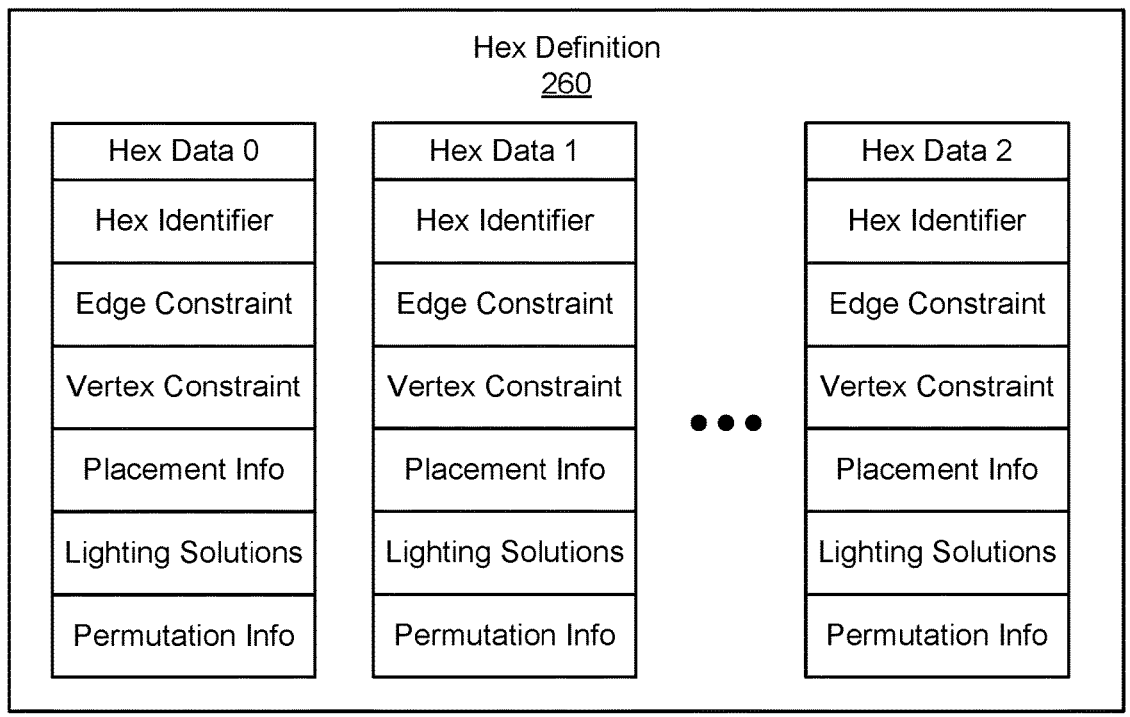
FIG. 4B is a block diagram of hex data used by software modules in memory of the client device of FIG. 1, according to an embodiment.

FIG. 4B is a block diagram of hex data used by the software modules in the memory of the client device of FIG. 1, according to an embodiment. In particular, FIG. 4B illustrates hex definition data 260, according to one embodiment. The hex definition data 260 includes full hex data for each hex, which, in one embodiment, is indexed by hex identifier. Each hex is associated with a hex identifier, edge constraints, vertex constraints, placement information, lighting solutions, and permutation information. As described above, the hex identifier distinguishes the hex from other hexes. For example, the hex identifier may an alphanumeric string.

Edge constraints are constraint conditions relating to one or more faces of a hex. Edge constraints may include a constraint upon a type of face, such that a face of a hex may only be placed within the terrain such that it borders a face of an adjacent hex that has the same type of face. For example, a first hex has a first face with a first type of face. The first hex may be placed within a terrain only at locations where the first face borders a second face of a second hex that also has the first type of face. As a specific example, if the first face of the first hex is a "river" type of face, then the first hex may be placed adjacent to the second hex with the first face and the second face bordering one another only if the second face is also a "river" type of face. Each face of a hex may include one or more edge constraints, which may restrict the type of face the face can border. However, for some types of faces, faces with those types of faces may border other hexes with any of a set of types of faces. For example, in an embodiment, a face with a "grassland" type of face may border a face of an adjacent hex that has either a "grassland" type of face, or a "forest" type of face. Depending upon the embodiment, hex faces may have additional edge constraints. Edge constraints are further described below with reference to FIG. 6B.

Vertex constraints are constraint conditions relating to the six vertices of a hex. Each vertex of the hex has a height level, such as "low," "medium," and "high." More or fewer than three height levels may be used. The height level of a vertex corresponds to the topography of the hex at the vertex. For example, if two vertices on either side of a face of the hex are "high," then that face of the hex, from the one vertex to the other, may be a peak of a hill, or so on. If one of the two vertices is "high" and the other is "medium," the topography of the hex at that face of the hex may be a slope, such as a side of a hill or a staircase, or may include a cliff that changes the topography from "high" to "medium" along the face of the hex.

In an embodiment, vertex constraints limit which height levels a vertex of a particular height level may be adjacent to. For example, in one embodiment, adjacent vertices cannot be more than one height level different from one another, e.g. a "low" cannot be next to a "high" but can be next to a "low" or a "medium." Vertex constraints may differ depending upon whether an adjacent vertex is within the same hex or is in an adjacent hex. For example, a vertex constraint may be that adjacent vertices in adjacent hexes must be of the same height, but adjacent vertices within the same hex may vary by up to one height level. Vertex constraints are further described below with reference to FIG. 5.

Placement information is additional information pertaining to where a hex may be placed. Some hexes may have constraint conditions in addition to edge constraints and vertex constraints. For example, in an embodiment, hexes of a particular lighting permutation may only be placed adjacent to other hexes with the same lighting permutation, or hexes with a lighting permutation of a subset of the set of lighting permutations. Other constraint conditions included in placement information may have to do with game objectives, objects within tiles, or so on.

Lighting solutions are lighting permutations of a hex, and data pertaining to the implementation of the lighting permutations. Lighting permutations exist for each of the six possible rotations of a hex. Furthermore, for each of the six possible rotations of the hex, there are lighting permutations for each lighting condition of a set of lighting conditions, which includes one or more different lighting conditions, such as "morning," "daytime," "afternoon," "evening," "rainy day," "nighttime," and so on. For example, a hex with four different lighting conditions would have 24 total lighting permutations—four for each of the six possible rotations of the hex.

Lighting solutions may be implemented in a variety of ways. In one embodiment, the lighting solutions are implemented using image-based lighting. Image-based lighting ("IBL") is a 3D rendering technique where omnidirectional representations of light information is captured as an image, which is projected onto a shape, such as a box or a sphere. The shape, a "light probe," is placed within the terrain and used to simulate the light from the environment. Hexes may contain a plurality of these light probes spread throughout the hex, to provide realistic lighting. In an embodiment, light probes may overlap multiple hexes, e.g. at a border between two hexes. The light probe is split in two, with one half in each hex, each providing light information for the other hex.

Permutation information is data relating to the six possible rotations of a hex. Each rotation of the hex appears different when rendered. As such, the permutation information includes graphical data for each of the six rotations of the hex. For example, for one permutation, the hex includes a river at a Northern part of the hex, while in a second permutation, the river is at an Eastern part of the hex. These permutations are both included in the permutation information. In an embodiment, the lighting permutations are included in the permutation information, with each rotation permutation including data for each lighting permutation. As mentioned above, in one embodiment, each possible overall mutation of each hex has its own hex identifier. In such embodiments, the lighting solutions and/or permutation information includes just one rotation and one lighting condition; other rotations and lighting conditions are associated with other hex identifiers within the hex definition data 260.

Figure 5:
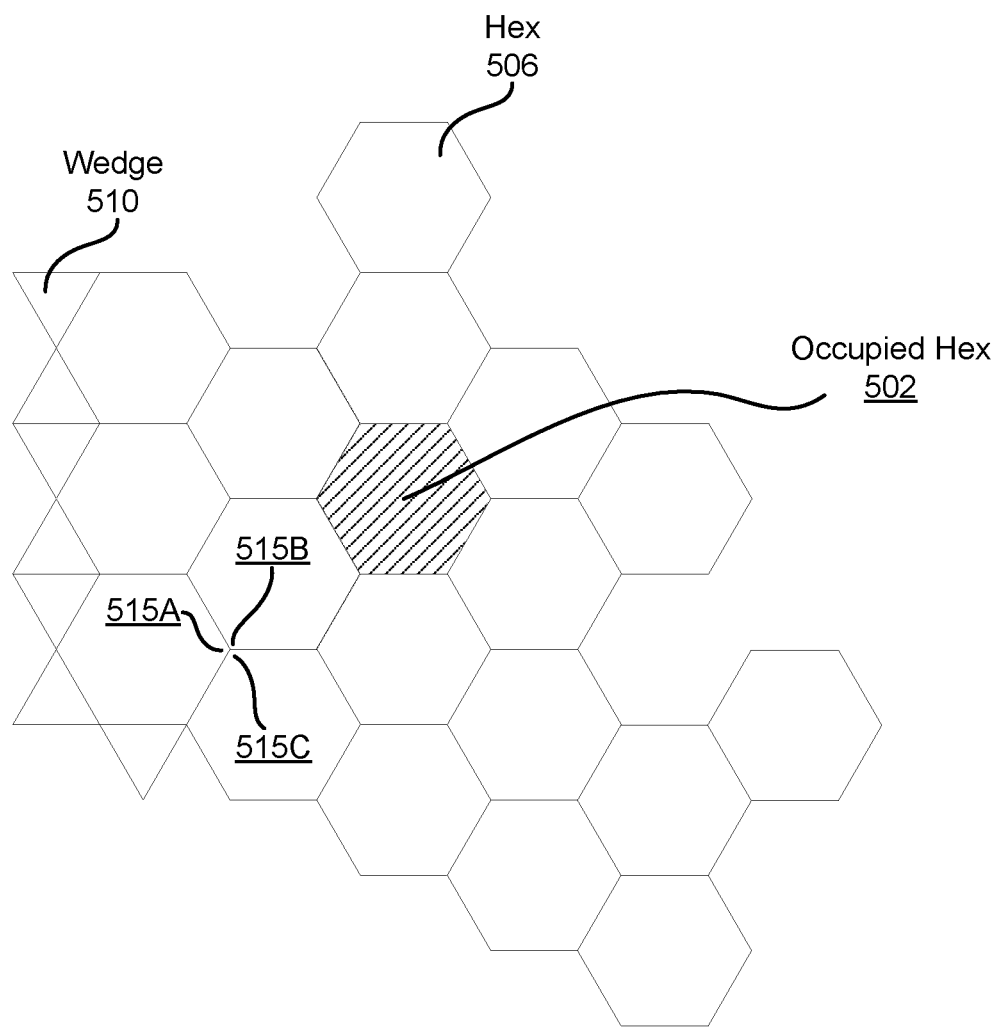
FIG. 5 is an illustration of a hexagonal terrain, according to an embodiment.

FIG. 5 is an illustration of a hexagonal terrain, according to an embodiment. The terrain includes 19 hexes placed at 19 locations within the terrain, arranged in an asymmetric pattern. FIG. 5 also includes seven wedges, as well as a plurality of vertices and faces at each hex. FIG. 5 includes an occupied hex 502, which is a hex occupied by a user's game character.

When rendering the terrain, the client device 140 may add wedges, such as wedge 510, around part or all of the terrain. Wedges are hexes or portions of hexes, e.g. triangular geometries, which bound the terrain based on the vertex constraints of the hexes bordered by the wedges. For example, a wedge that borders a hex face which extends from a first vertex to a second vertex. If the first vertex is "high" and the second vertex is "medium," then the wedge may include a sloping wall from the first vertex to the second vertex that parallels the change in height from the first vertex to the second vertex and is impassible to objects and game characters, particularly the user's game character. In an embodiment, a module of the game system 300, such as the terrain generator 350, adds one or more wedges to the terrain when constructing the terrain, rather than at render time. In one embodiment, each wedge vertex that borders a hex vertex is one height level greater than the height level of the hex vertex.

The occupied hex 502 is a hex occupied by the user's game character. When rendering the terrain, the game system 300 may render only a portion of the terrain at a time. In one embodiment, the game system 300 renders the occupied hex 502 and each hex directly bordering the occupied hex 502. For example, the hex between the occupied hex 502 and hex 506 would be rendered, but hex 506 would not be rendered. This may be done to save computing resources, or to accommodate a limitation upon active memory or processing power. In other embodiments, different subsets of the hexes in the terrain may be rendered, such as only hexes within a line of sight of the user's game character, or hexes that border either the occupied hex 502 or a hex that borders the occupied hex 502.

Several vertex constraints are illustrated in FIG. 5. In one embodiment, vertices which converge at a point, such as vertices 515A-C, must be the same height level. For example, if the hex containing vertex 515B were added to the terrain and vertex 515B was "high," then the hexes containing vertices 515A and 515C could only be placed if vertices 515A and 515C were also "high." In alternative embodiments, the vertices 515 could border each other only if no vertex 515 was more than one height level from any other bordering vertex 515.

Figure 6A:
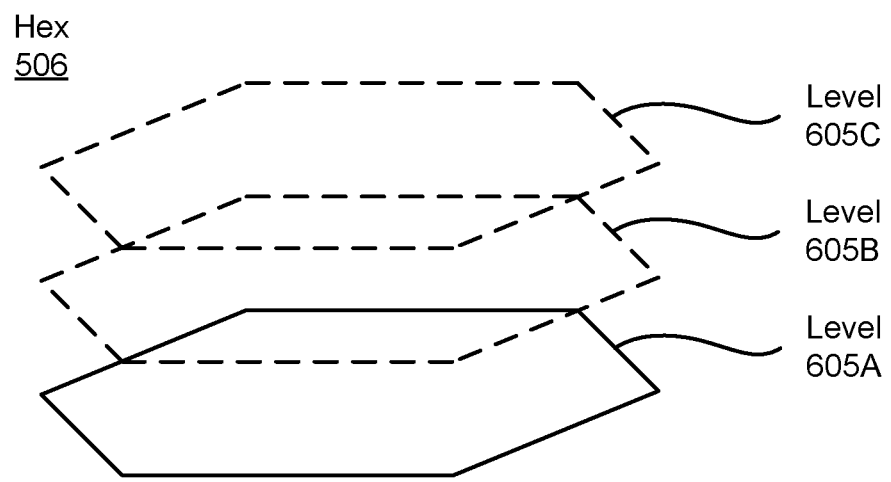
FIG. 6A is an illustration of a terrain height constraint condition of a hexagonal tile, according to an embodiment.

FIG. 6A is an illustration of a terrain height constraint condition of hex 506, according to an embodiment. In particular, several height levels 605 are illustrated. Each hex has at least two height levels 605, and in some embodiments may have more than three height levels 605. Height level 605A is a "low" height level, height level 605B is a "medium" height level, and height level 605C is a "high" height level. The 3D topography included within a hex can vary among height levels. A first tile may be a grassland that is entirely at level 605A. A second tile may be a series of hills that varies between levels 605A-B throughout the hex. A third tile may be a large mountain centered within the hex, where the outskirts of the hex are low, the middle of the hex is high, and the space between is medium.

Figure 6B:
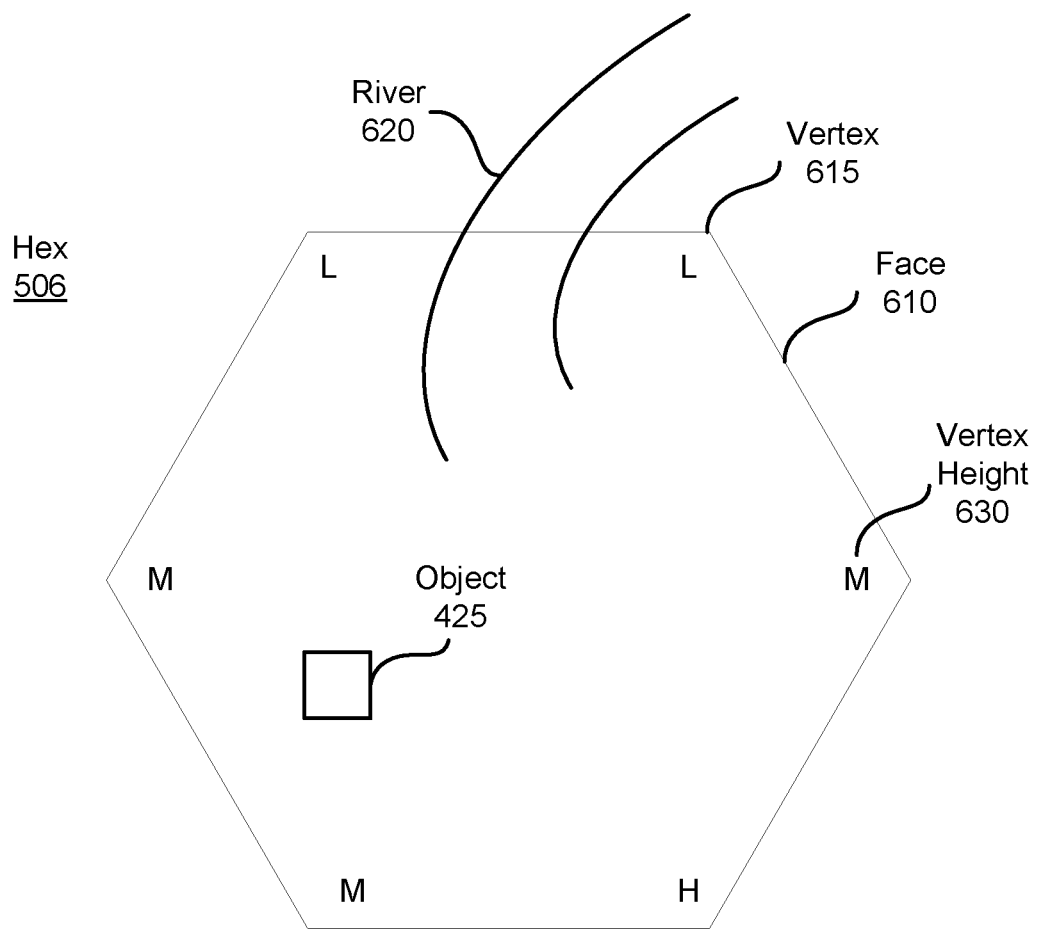
FIG. 6B is an illustration of a hexagonal tile, according to an embodiment.

FIG. 6B is an illustration of a hexagonal tile, according to an embodiment. FIG. 6B illustrates hex 506 as well as several features of the hex 506. The hex 506 has a face 610 with endpoints at vertices 615 and 630, and includes an object 425 and a river 620. The object 425 is an interactive game component that may be placed within the hex 506. For example, the object 425 may be a rock that the user's game character can pick up, or may be an enemy that attacks the user's game character when approached. Depending upon the embodiment, hexes automatically include one or more objects, objects are added to hexes via the game level editor 112, or both.

The river 620 is a topological feature included in the hex 506 which extends to a face of the hex 506. The river 620 is an edge constraint of the hex 506. A second hex placed such that it borders the hex 506 at the face intersected by the river 620 must also have a river feature at its face which borders the hex 506. If a wedge is placed bordering the face intersected by the river 620, the wedge may include a waterfall or other element which pertains to the river. Similarly, hexes or wedges placed within the terrain must comply with the edge constraints of the hexes which they border. Another example of an edge constraint may be a road.

A border hex placed such that it borders the hex 506 at the face 610 must comply with constraint conditions pertaining to the face 610 and the vertices 615, 630 which bound it. In an embodiment, the border hex has a first vertex which, like vertex 615, is "L," or "low," and a second vertex which, like vertex 630, is "M," or "medium," each of which borders the vertex 615, 630 of corresponding height level. As seen in the figure, each vertex has a height level, and no vertex is more than one height level different from a neighboring vertex.

Figure 7:
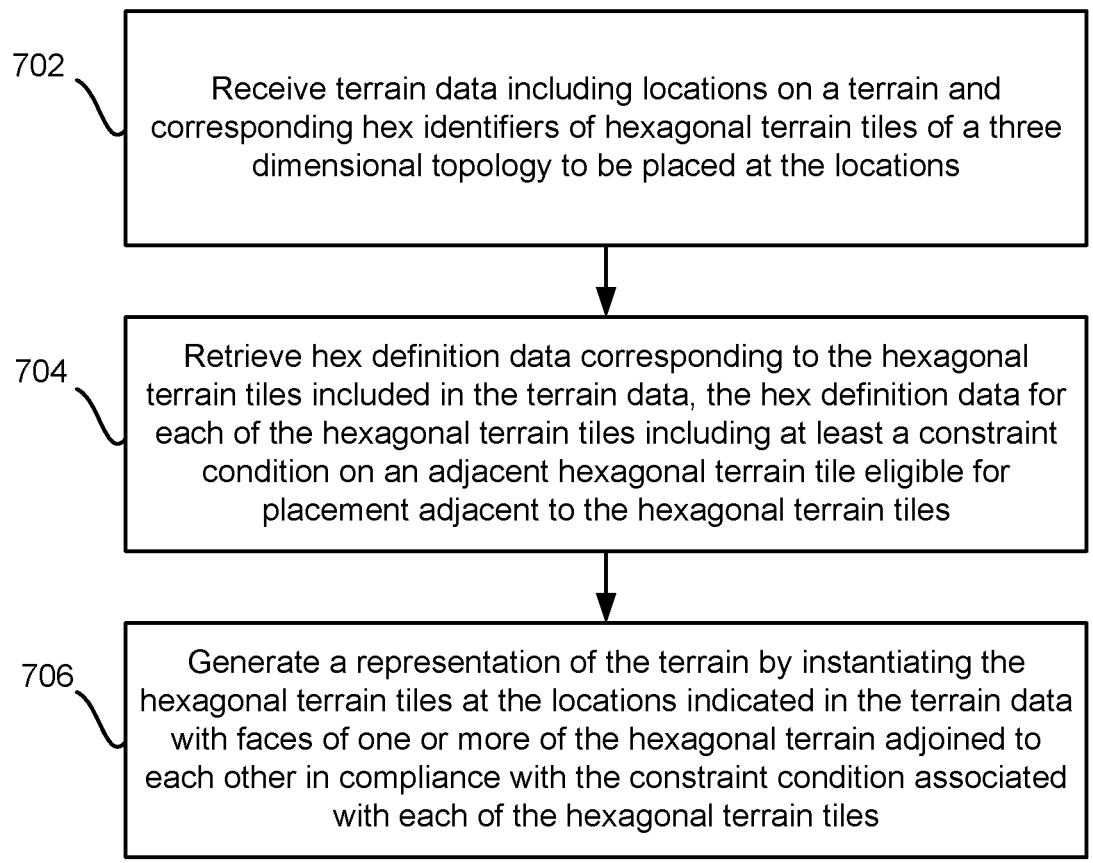
FIG. 7 is a flowchart illustrating a process for implementing the techniques described herein, according to an embodiment.

FIG. 7 is a flowchart illustrating a process for implementing the techniques described herein, according to an embodiment. The client device 140 receives 702 terrain data including locations on a terrain and corresponding hex identifiers of hexagonal terrain tiles of a three-dimensional topology to be placed at the locations. For example, the client device 140 receives a data object from the server 120.

The client device 140 retrieves 704 hex definition data corresponding to the hexagonal terrain tiles included in the terrain data, the hex definition data for each of the hexagonal terrain tiles including at least a constraint condition on an adjacent hexagonal terrain tile eligible for placement adjacent to the hexagonal terrain tiles. The constraint condition may be, for example, a vertex constraint or an edge constraint.

The client device generates 706 a representation of the terrain by instantiating the hexagonal terrain tiles at the locations indicated in the terrain data with faces of one or more of the hexagonal terrain adjoined to each other in compliance with the constraint condition associated with each of the hexagonal terrain tiles. Instantiating the hexagonal terrain tiles may include rendering the terrain.

In an embodiment, the hex definition data further includes a plurality of light solutions, each of the light solutions represented by a collection of light probes for determining appearance of objects in a hexagonal terrain tile in a different lighting condition.

In an embodiment, the hex definition data further includes placement information indicating locations of objects in each of the hexagonal terrain tiles.

In an embodiment, the hex definition data further includes permutation information representing variations applicable to each of the hexagonal terrain tiles.

In an embodiment, the process further comprises determining, by the client device 140, compliance of the constraint condition of one or more the hexagonal terrain tiles.

In an embodiment, the terrain data is included in a game level data received from another computing device, such as a content creator 110 or a server 120, and the game level data further includes at least an objective of the game level.

In an embodiment, the terrain data further includes an orientation of each of the hexagonal terrain tiles.

In an embodiment, the terrain data further comprises game play parameters indicating restrictions on objects or characters to appear in each of the corresponding locations. For example, based on a game objective, various restrictions may be placed upon which objects or characters may be placed in a hex, and where in the hex they may be placed.

In an embodiment, the hex definition data comprises original hex definition data stored on a read-only storage medium and a supplemental hex definition data received from another computing device in a patch or an expansion pack.

In an embodiment, the terrain data indicates placing of a wedge adjacent to at least one of the hexagonal terrain tiles.

In an embodiment, responsive to information on a hexagonal terrain tile for a location in the terrain missing from the terrain data, the client device 140 automatically determines a hexagonal terrain tile for the location with the missing information in compliance with the constraint condition associated with hexagonal terrain tiles adjacent to the location.

Figure 8:
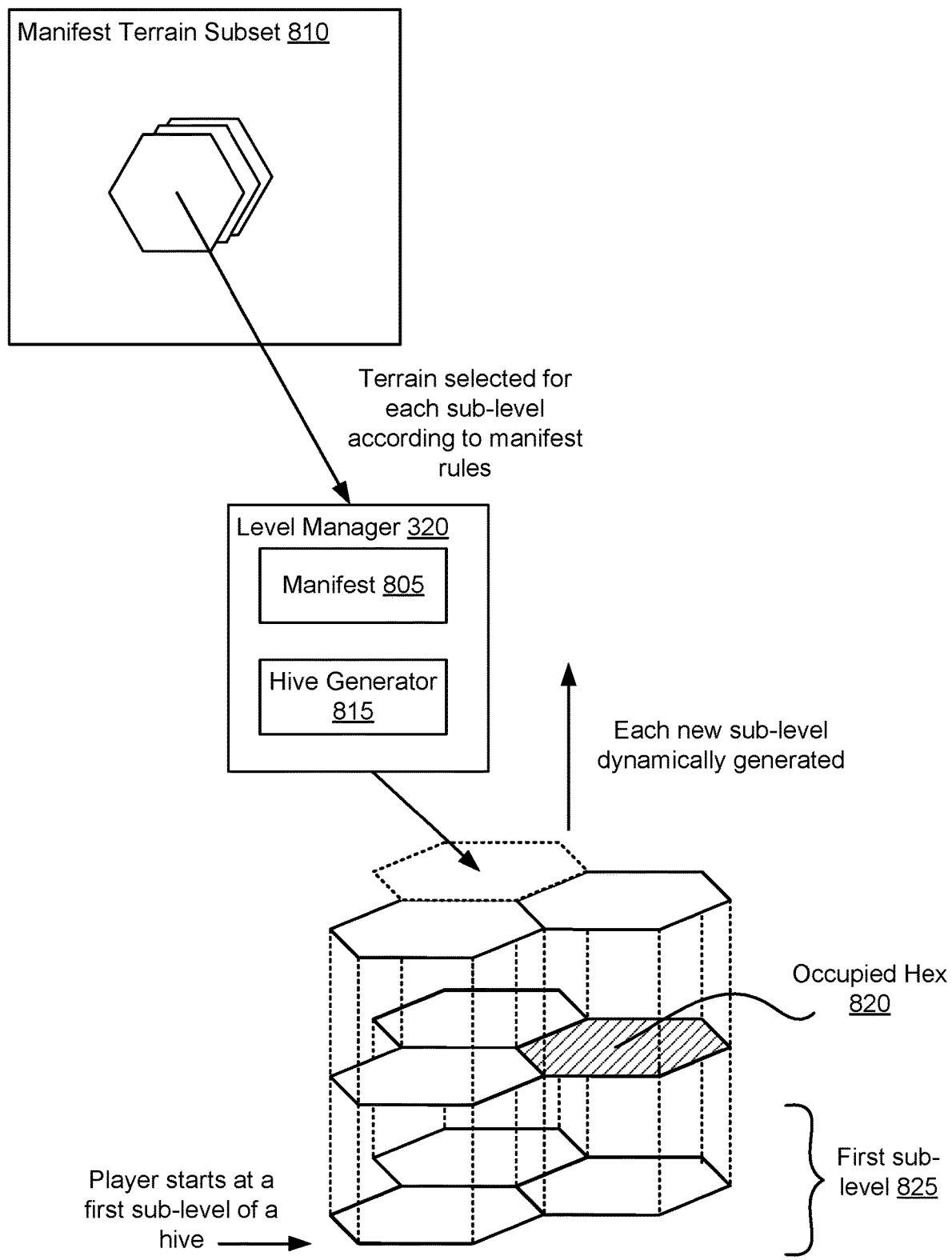
FIG. 8 is an illustration of hive generation, according to an embodiment.

FIG. 8 is an illustration of hive generation, according to an embodiment. One or more operations 312 may involve hive generation, which the game system 300 performs as part of level generation using a hive manifest 805 and a hive generator 815 module of the level manager 320.

In an embodiment, a video game includes a world map upon which different terrains are placed. The user playing the game can interact with the video game to change from one terrain to another, e.g., in the course of proceeding from one game level to another. Some game levels include hives, which are randomly generated based on hive manifests. Upon selection by a user of a game level including a hive, the hive generator 815 uses the hive manifest 805 to dynamically generate a hive for the game level.

The hive manifest 805 includes one or more conditions or rules for hive generation. for example, the hive manifest may include one or more conditions or rules for setting parameters for a game mission. A "mission type" condition may specify which type of mission is involved with the hive. A "mission key" condition may specify missions related to the mission of the hive. A "reward table identifier" condition may specify a set of rewards for the player upon completion of the game level. Rules may be set for a minimum or maximum game character level (e.g., an amount of game progress) to play a game level including the hive. For example, the hive manifest 805 may specify that a player's game character must have a level within a range of a minimum level and a maximum level in order to play the game level, or that a player's game character must have at least a threshold level or amount of game progress to play the game level with the hive.

The hive manifest 805 may include conditions specifying one or more lighting permutations to be used when rendering the hive. Similarly, the hive manifest 805 may include conditions specifying one or more weather conditions to be used when rendering the hive.

The hive manifest 805 may include weighted modifiers for each of a plurality of categories of terrains and/or hexes. For example, one category of terrain may be weighted more than a second category of terrain, and upon generation of the hive, the hive generator 815 is more likely to select a terrain of the first category than the second category. Different categories of terrain and/or terrain attributes may be weighted such that the likelihood of corresponding terrains being selected by the hive generator 815 proportionally increase with the weighting.

The hive manifest 805 may include one or more rules specifying which game characters and/or which categories of game characters can or cannot participate in the game level including the hive. In an embodiment, one or more game characters flagged as "dead" or unplayable by the user cannot be selected for use for playing the game level including the hive.

The hive manifest 805 may include one or more conditions specifying where on the world map to situate an indicator for the game level including the hive. For example, if the game level is designed to take place in a terrain representation of New York, the hive manifest 805 may specify a latitude and longitude upon the world map specifying a location for an indicator for the game level to be placed, e.g., at the location of the Chrysler Building. Selection of the indicator by the user on the world map launches the game level. The hive manifest 805 may additionally include one or more graphical elements for use as the indicator, or identifiers for one or more graphical elements to use as the indicator that may be loaded from the content source 312.

The hive manifest 805 may include one or more rules specifying game parameter overrides. For example, the hive manifest 805 may specify that one or more standard game rules are replaced with a rule specific to the game level with the hive. As a particular example, one or more game characters not typically permitted to a particular terrain due to a standard game rule may be playable at the game level including the hive even if the game level uses the particular terrain, due to the hive manifest 805 overriding the standard game rule. Additionally, the hive manifest 805 may override one or more game level parameters, such as a combat intensity modifier, an enemy spawn modifier, a power level modifier, and a turret generation modifier. The hive manifest 805 may additionally override objective parameters, such as a gameplay goal for a terrain and/or hex. For example, the hive manifest 805 may include an override for a hex to add a game objective to the hex.

The hive manifest 805 can include a hive availability schedule. The hive availability schedule indicates time periods on which the hive can be generated. For example, the hive availability schedule may indicate that the hive can only be generated on the fourth of July. As such, the hive manifest 805 can only be downloaded by the client 140 on the fourth of July, and/or hives can only be generated using the hive manifest 805 on the fourth of July.

The hive manifest 805 includes a sub-level list. The hive includes a plurality of sub-levels, where each sub-level includes a terrain of one or more hexes. The sub-level list included a number of sub-levels parameter, which specifies a number of sub-levels to include in the hive. The player progresses through a first sub-level 825, and upon reaching an end hex, causes progression to the second sub-level, and so on until each sub-level has been played, at which point the game level is complete. For example, a user game character may be at occupied hex 820, which is the end hex. As such, the hive generator 815 generates a third sub-level from the terrain subset 810. The hive manifest 805 includes indicators of which hexes are end hexes for each sub-level.

The hive manifest 805 may include metadata including information about the hive for display using a user interface of the game presented to the player. For example, the metadata may include a name for the hive, a difficulty of the hive, story information such as text pertaining to a game story arc, and so on.

The hive generator 815 may generate sub-levels altogether or one at a time as the player progresses through the hive, depending upon the embodiment. For each sub-level, the hive generator 815 identifies a subset of terrains 810 that satisfy the conditions and rules of the hive manifest 805 and selects a terrain from the subset of terrains 810 to use as the sub-level for that instance of the hive. Different game levels using the same hive manifest may select different terrains. Selection of a particular terrain from the subset of terrains 810 may be random or quasi-random depending upon the embodiment. For example, the hive manifest 805 may include preset descriptors of requirements for terrains for each sub-level, and the hive generator 815 identifies terrains that satisfy the requirements from the subset of terrains 810. The hive generator 815 may weight selected terrains to alter the likelihood the selected terrain is selected for subsequent sub-levels, e.g., to lessen the likelihood of selection of the selected terrain for a subsequent sub-level.

Depending upon the embodiment, the hive generator 815 may select a terrain for each sub-level from a subset of terrains that match the conditions and rules of the hive manifest 805, or the hive generator 815 generates a terrain for each sub-level using one or more hexes that match the conditions and rules of the hive manifest 805. For example, the hive generator 815 selects a subset of hexes that satisfy the conditions and rules of the hive manifest 805 and sends the subset of hexes to the terrain generator 350 for construction into a terrain, as described with reference to FIG. 3. In an embodiment, the hive generator 815 selects a terrain for each sub-level, then requests the selected terrains from the server 120. The server 120 sends data for the selected terrain to the hive generator 815, which compiles the selected terrains into the hive, locally modifying the terrain data according to the rules and conditions in the hive manifest 805. For example, the hive generator 815 overrides an objective in the terrain data for a terrain selected for a first sub-level, changes the weather data for a terrain selected for a second sub-level, and adjusts the enemy spawn modifier for a terrain selected for a third sub-level. The hive generator 815 also marks a hex of each terrain as an end hex, which may be based on terrain data downloaded from the server or on data in the hive manifest 805.

Figure 9:
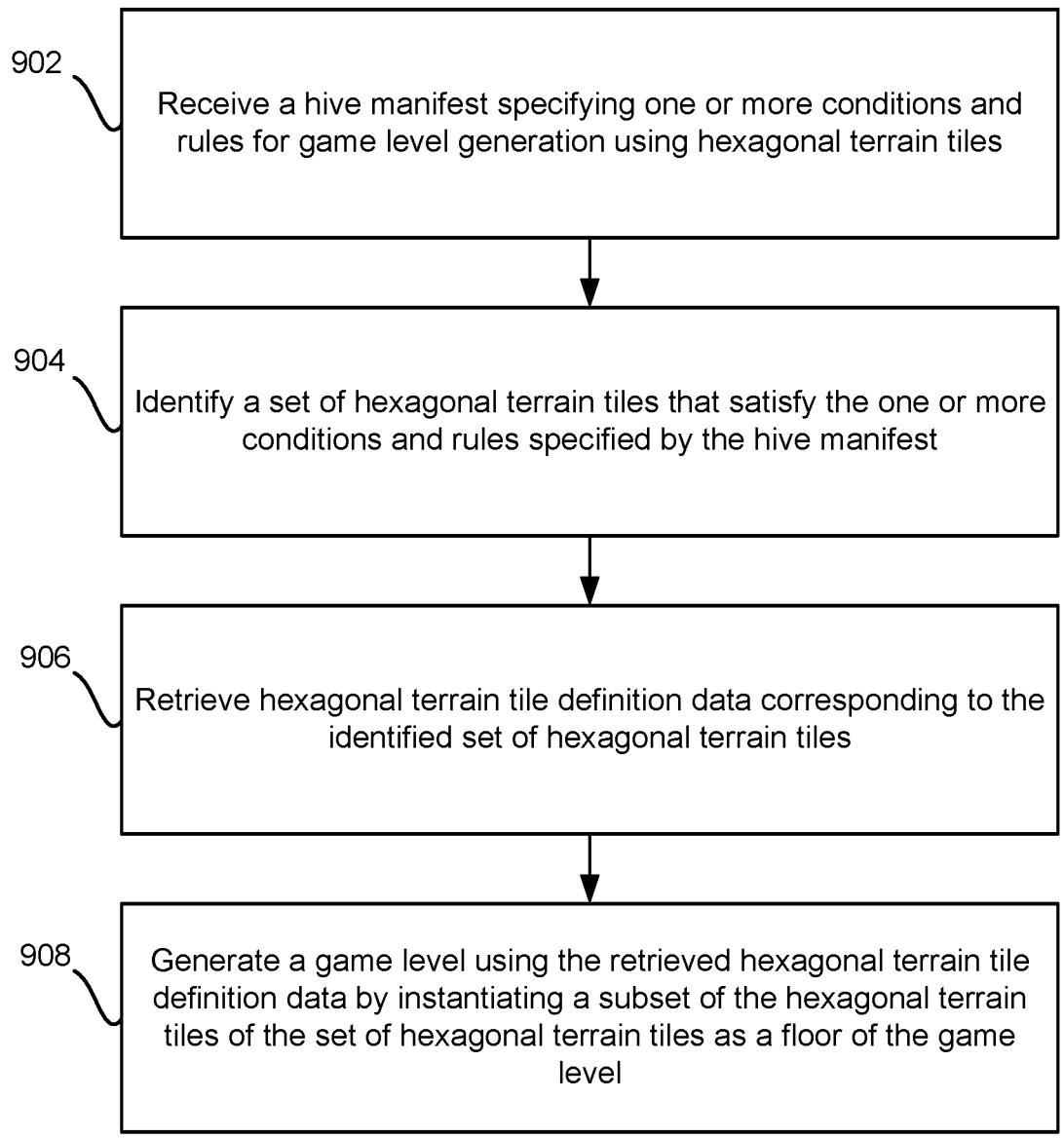
FIG. 9 is a flowchart illustrating a process for implementing the techniques described herein, according to an embodiment.

FIG. 9 is a flowchart illustrating a process for implementing the techniques described herein, according to an embodiment. A computing device receives 902 a hive manifest specifying one or more conditions and rules for game level generation using hexagonal terrain tiles. The computing device identifies 904 a set of hexagonal terrain tiles satisfying the one or more conditions and rules specified by the hive manifest. The computing device retrieves 906 hexagonal terrain tile definition data corresponding to the identified set of hexagonal terrain tiles. The computing device generates 908 a game level using the retrieved hexagonal terrain tile definition data by instantiating a subset of hexagonal terrain tiles of the set of hexagonal terrain tiles as a sub-level of the game level.

In one or more embodiments, the computing device detects that a game player has completed the generated sub-level and generates a second sub-level including a set of hexagonal terrain tiles that satisfy the one or more conditions and rules specified by the hive manifest.

In one or more embodiments, the computing device generates a second game level using the retrieved hexagonal terrain tile definition data by instantiating a second subset of hexagonal terrain tiles of the set of hexagonal terrain tiles as a sub-level of the second game level, wherein the second subset of hexagonal terrain tiles includes at least one different hexagonal terrain tile than the subset of hexagonal terrain tiles.

In one or more embodiments, a condition of the hive manifest specifies a weight for a category of hexagonal terrain tile, wherein a likelihood of inclusion in the subset of hexagonal terrain tiles of hexagonal terrain tiles of the category is proportional to the specified weight.

In one or more embodiments, a rule of the hive manifest overrides a rule of a hexagonal terrain tile in the subset of hexagonal terrain tiles.

In one or more embodiments, the computing device receives the hive manifest from a game server separate from the computing device.

In one or more embodiments, the hive manifest specifies a gameplay mission parameter.

Although embodiments described above are explained primarily in reference to a game system, the embodiments may be applied to other applications such as engineering software, navigational software, and educational software, such as a map application or a ride hailing application. Additionally, embodiments can be applied to research applications.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method, comprising:
   receiving, at a computing device, from a server separate from the computing device, a hive manifest specifying one or more conditions and rules for game level generation using hexagonal terrain tiles stored on the computing device, the hive manifest not comprising a hexagonal terrain tile;
   identifying, by the computing device, from a pool of stored hexagonal terrain tiles at the computing device, a set of hexagonal terrain tiles that satisfy the one or more conditions and rules specified by the hive manifest, the set of hexagonal terrain tiles including a subset of hexagonal terrain tiles in the pool of stored hexagonal terrain tiles;
   retrieving, by the computing device, hexagonal terrain tile definition data corresponding to the identified set of hexagonal terrain tiles; and
   generating, by the computing device, a game level using the retrieved hexagonal terrain tile definition data by instantiating a subset of hexagonal terrain tiles of the set of hexagonal terrain tiles as a sub-level of the game level.

2. The method of claim 1, further comprising:
   detecting that a game player has completed the sub-level; and
   responsive to detecting that the game player has completed the sub-level, generating a second sub-level including a set of hexagonal terrain tiles that satisfy the one or more conditions and rules specified by the hive manifest.

3. The method of claim 1, further comprising:
   generating a second game level using the retrieved hexagonal terrain tile definition data by instantiating a second subset of hexagonal terrain tiles of the set of hexagonal terrain tiles as a sub-level of the second game level, wherein the second subset of hexagonal terrain tiles includes at least one different hexagonal terrain tile than the subset of hexagonal terrain tiles.

4. The method of claim 1, wherein a condition of the hive manifest specifies a weight for a category of hexagonal terrain tile, wherein a likelihood of inclusion in the subset of hexagonal terrain tiles of hexagonal terrain tiles of the category is proportional to the specified weight.

5. The method of claim 1, wherein a rule of the hive manifest overrides a rule of a hexagonal terrain tile in the subset of hexagonal terrain tiles.

6. The method of claim 1, wherein the hive manifest specifies a gameplay mission parameter.

7. A non-transitory computer-readable storage medium storing computer program instructions executable by a processor to perform operations, the operations comprising:
   receiving, at a computing device, from a server separate from the computing device, a hive manifest specifying one or more conditions and rules for game level generation using hexagonal terrain tiles stored on the computing device, the hive manifest not comprising a hexagonal terrain tile;
   identifying, by the computing device, from a pool of stored hexagonal terrain tiles at the computing device, a set of hexagonal terrain tiles that satisfy the one or more conditions and rules specified by the hive manifest, the set of hexagonal terrain tiles including a subset of hexagonal terrain tiles in the pool of stored hexagonal terrain tiles;
   retrieving, by the computing device, hexagonal terrain tile definition data corresponding to the identified set of hexagonal terrain tiles; and
   generating, by the computing device, a game level using the retrieved hexagonal terrain tile definition data by instantiating a subset of hexagonal terrain tiles of the set of hexagonal terrain tiles as a sub-level of the game level.

8. The non-transitory computer-readable storage medium of claim 7, the operations further comprising:
   detecting that a game player has completed the generated sub-level; and
   responsive to detecting that the game player has completed the sub-level, generating a second sub-level including a set of hexagonal terrain tiles that satisfy the one or more conditions and rules specified by the hive manifest.

9. The non-transitory computer-readable storage medium of claim 7, the operations further comprising:
   generating a second game level using the retrieved hexagonal terrain tile definition data by instantiating a second subset of hexagonal terrain tiles of the set of hexagonal terrain tiles as a sub-level of the second game level, wherein the second subset of hexagonal terrain tiles includes at least one different hexagonal terrain tile than the subset of hexagonal terrain tiles.

10. The non-transitory computer-readable storage medium of claim 7, wherein a condition of the hive manifest specifies a weight for a category of hexagonal terrain tile, wherein a likelihood of inclusion in the subset of hexagonal terrain tiles of hexagonal terrain tiles of the category is proportional to the specified weight.

11. The non-transitory computer-readable storage medium of claim 7, wherein a rule of the hive manifest overrides a rule of a hexagonal terrain tile in the subset of hexagonal terrain tiles.

12. The non-transitory computer-readable storage medium of claim 7, wherein the hive manifest specifies a gameplay mission parameter.

13. A system, comprising:
   a processor; and
   a non-transitory computer-readable storage medium storing computer program instructions executable by the processor to perform operations, the operations comprising:
   receiving, at a computing device, from a server separate from the computing device, a hive manifest specifying one or more conditions and rules for game level generation using hexagonal terrain tiles stored on the computing device, the hive manifest not comprising a hexagonal terrain tile;
   identifying, by the computing device, from a pool of stored hexagonal terrain tiles at the computing device, a set of hexagonal terrain tiles that satisfy the one or more conditions and rules specified by the hive manifest, the set of hexagonal terrain tiles including a subset of hexagonal terrain tiles in the pool of stored hexagonal terrain tiles;

retrieving, by the computing device, hexagonal terrain tile definition data corresponding to the identified set of hexagonal terrain tiles; and generating, by the computing device, a game level using the retrieved hexagonal terrain tile definition data by instantiating a subset of hexagonal terrain tiles of the set of hexagonal terrain tiles as a sub-level of the game level.

14. The system of claim 13, further comprising:

detecting that a game player has completed the sub-level; and responsive to detecting that the game player has completed the sub-level, generating a second sub-level including a set of hexagonal terrain tiles that satisfy the one or more conditions and rules specified by the hive manifest.

15. The system of claim 13, further comprising:

generating a second game level using the retrieved hexagonal terrain tile definition data by instantiating a second subset of hexagonal terrain tiles of the set of hexagonal terrain tiles as a sub-level of the second game level, wherein the second subset of hexagonal terrain tiles includes at least one different hexagonal terrain tile than the subset of hexagonal terrain tiles.

16. The system of claim 13, wherein a condition of the hive manifest specifies a weight for a category of hexagonal terrain tile, wherein a likelihood of inclusion in the subset of hexagonal terrain tiles of hexagonal terrain tiles of the category is proportional to the specified weight.

17. The system of claim 13, wherein a rule of the hive manifest overrides a rule of a hexagonal terrain tile in the subset of hexagonal terrain tiles.

\* \* \* \* \*